United States Patent
Doosttalab et al.

(10) Patent No.: US 11,174,834 B2
(45) Date of Patent: Nov. 16, 2021

(54) VORTEX GENERATOR FOR FASTENING TO A WIND TURBINE ROTOR BLADE

(71) Applicant: Nordex Energy SE & Co. KG, Hamburg (DE)

(72) Inventors: Mehdi Doosttalab, Norderstedt (DE); Christof Rautmann, Hamburg (DE); Thomas Lipka, Rostock (DE); Philipp Rindt, Rostock (DE)

(73) Assignee: Nordex Energy SE & Co. KG, Hamburg (DE)

(*) Notice: Subject to any disclaimer, the term of this patent is extended or adjusted under 35 U.S.C. 154(b) by 78 days.

(21) Appl. No.: 16/352,637

(22) Filed: Mar. 13, 2019

(65) Prior Publication Data

US 2019/0285046 A1  Sep. 19, 2019

(30) Foreign Application Priority Data

Mar. 13, 2018 (EP) .................................. 18161546

(51) Int. Cl.
*F03D 1/06* (2006.01)
*F04D 29/66* (2006.01)

(52) U.S. Cl.
CPC ......... *F03D 1/0641* (2013.01); *F03D 1/0633* (2013.01); *F03D 1/0683* (2013.01); *F04D 29/667* (2013.01); *F05B 2230/60* (2013.01); *F05B 2240/122* (2013.01); *F05B 2240/2212* (2013.01); *F05B 2240/301* (2013.01); *F05D 2240/304* (2013.01)

(58) Field of Classification Search
CPC .... F03D 1/0633; F03D 1/0641; F03D 1/0683; F05D 2240/304; F04D 29/667; F05B 2240/122
See application file for complete search history.

(56) References Cited

U.S. PATENT DOCUMENTS

| 9,556,849 | B2 | 1/2017 | Riddell et al. | |
|---|---|---|---|---|
| 9,562,513 | B2 | 2/2017 | Tobin et al. | |
| 2008/0175711 | A1* | 7/2008 | Godsk | F03D 7/0224 416/147 |
| 2012/0151769 | A1* | 6/2012 | Brake | F03D 1/0608 29/889.71 |
| 2012/0257977 | A1 | 10/2012 | Jensen et al. | |
| 2014/0140856 | A1 | 5/2014 | Madsen et al. | |
| 2014/0328687 | A1* | 11/2014 | Tobin | F03D 1/0675 416/174 |

(Continued)

FOREIGN PATENT DOCUMENTS

| CN | 207420779 U | 5/2018 |
|---|---|---|
| EP | 2484898 B1 | 4/2014 |

(Continued)

*Primary Examiner* — David Hamaoui
*Assistant Examiner* — Andrew J Marien
(74) *Attorney, Agent, or Firm* — Walter Ottesen, P.A.

(57) ABSTRACT

A vortex generator defines a longitudinal direction and has two fins, which are each arranged at an angle in relation to the longitudinal direction and extend over a first length in the longitudinal direction, and a base, which connects the two fins to each other, the base having a width and extending over a second length in the longitudinal direction, wherein the second length is less than the first length over the entire width of the base.

18 Claims, 5 Drawing Sheets

(56) References Cited

U.S. PATENT DOCUMENTS

| | | | | |
|---|---|---|---|---|
| 2014/0328692 A1* | 11/2014 | Riddell | ............... | F03D 1/0633 |
| | | | | 416/236 R |
| 2016/0215758 A1* | 7/2016 | Corten | ............... | F03D 1/0675 |
| 2018/0038342 A1* | 2/2018 | Tobin | ............... | F03D 1/0608 |
| 2019/0226446 A1* | 7/2019 | Fukami | ............... | F03D 1/0633 |

FOREIGN PATENT DOCUMENTS

| | | |
|---|---|---|
| EP | 2826708 B1 | 7/2016 |
| EP | 2799709 B1 | 9/2016 |
| WO | 2013014082 A2 | 1/2013 |
| WO | 2015030573 A1 | 3/2015 |

\* cited by examiner

VORTEX GENERATOR FOR FASTENING TO A WIND TURBINE ROTOR BLADE

CROSS REFERENCE TO RELATED APPLICATION

This application claims priority of European patent application no. 18 161 546.9, filed Mar. 13, 2018, the entire content of which is incorporated herein by reference.

FIELD OF THE INVENTION

The disclosure relates to a vortex generator for fastening to a wind turbine rotor blade. Vortex generators, occasionally also referred to as eddy generators, are used in the case of wind turbine rotor blades to selectively influence the flow conditions. They have two fins, arranged at a distance from each other, which each project from the surface of the rotor blade into a boundary layer of the flow, and which are aligned at an angle in relation to the direction of incident flow. When, during the operation of the rotor blade, these fins are subjected to the incident air flow, this results in the formation of high-energy eddies and, downstream from the vortex generator, in a turbulent boundary layer. In the blade root region, in particular, in many cases it has been found to be appropriate to use this effect to avoid or delay flow separations. For this purpose, the vortex generators must be fastened to suitable positions on the blade surface. This is generally effected by adhesive bonding.

BACKGROUND OF THE INVENTION

There are considerable difficulties associated with this fastening. Basically, there are high demands on the quality of the fastening, since in operation the rotor blades of wind turbines are exposed to wind and weather for years, and are difficult to access for maintenance and repair work. In addition, the surface of the rotor blades has a curvature, which changes continuously, both in the direction of the blade depth, that is, from the profile leading edge toward the profile trailing edge, and in the longitudinal direction of the rotor blade, that is, from the blade root toward the blade tip.

Individual matching of the fastening face of each vortex generator to the curvature of the surface of the rotor blade that exists at the position of its intended fastening is not feasible. A flat face, or a face having a mean curvature, is therefore selected for the fastening faces of the vortex generators. The unavoidable gaps have to be filled with adhesive. This requires a relatively fluid adhesive that has a low initial adhesion, such that each vortex generator must be fixed in place until the adhesive provides sufficient adhesion. Adhesive tapes do not represent a suitable alternative, since they are only suitable to a limited extent for compensating differing gap dimensions. The mounting of the vortex generators is therefore resource-intensive and subject to error. In practice, it is repeatedly observed that individual vortex generators detach from the surface and ultimately fall off.

Vortex generators that have a curved fastening face for adhesive-bonding onto the surface of a wind turbine rotor blade have become known from the publication US 2012/0257977. The fastening face includes a large-area recess, in which the adhesive is to be arranged, and a peripheral edge, intended to protect the adhesive layer from external influences.

From the publication U.S. Pat. No. 9,556,849 it has become known to fasten vortex generators to a surface of a wind turbine rotor blade via an adhesive layer. The adhesive layer is to have a low shear modulus, in order to avoid separation of the vortex generators in the event of deformation of the rotor blade.

Vortex generators that are fastened to a surface of a wind turbine rotor blade via adhesive tapes have become known from the publication U.S. Pat. No. 9,562,513. The vortex generators are intended to be flexible, so that a fastening face of the vortex generators can adapt to the contour of the rotor blade.

Vortex generators having two fins that are connected to each other via a base plate have become known from the publication US 2016/0215758. The fins have a slight curvature, intended to increase flexibility of the base plate and to enable the base plate to be adapted to differing curvatures of the surface of the rotor blade. It is additionally proposed to realize the base plate as a U shape, V shape or W shape. This measure is intended to allow thermal expansion and, at the same time, to be aerodynamically advantageous.

SUMMARY OF THE INVENTION

Proceeding therefrom, it is an object of the invention to provide a vortex generator that can be fastened in a particularly simple and reliable manner to a surface of a wind turbine rotor blade.

This object can, for example, be achieved by a vortex generator having a longitudinal direction. The vortex generator includes: two fins each arranged at an angle $\alpha$ in relation to the longitudinal direction and extending over a first length L1 in the longitudinal direction; a base interconnecting the two fins; the base having a width B and extending over a second length L2 in the longitudinal direction; and, the second length L2 being less than the first length L1 over the entire width B of the base.

The vortex generator has a longitudinal direction, two fins, which are each arranged at an angle in relation to the longitudinal direction and extend over a first length in the longitudinal direction, and a base, which connects the two fins to each other, the base having a width and extending over a second length in the longitudinal direction, the second length being less than the first length over the entire width of the base.

The longitudinal direction corresponds to a design incident-flow direction, that is, the direction in which the vortex generator, in normal operation, receives an incident flow of air. If the vortex generator is fastened to the surface of a wind turbine rotor blade, the longitudinal direction lies in a profile plane of the rotor blade. The direction toward a profile leading edge of the rotor blade is referred to as front, and the direction toward a profile trailing edge is referred to as rear. Similarly, the specification "lower" relates to the direction toward the surface of the rotor blade, and the specification "upper" relates to the direction away from this surface.

Starting from the base, the fins extend upward, in particular approximately orthogonally in relation to the surface of the wind turbine rotor blade. In divergence from this, however, they may also be arranged with a greater or lesser inclination in relation to the surface. The fins have a height that can be adapted to the thickness of a boundary layer of the flow. In particular, the height may be somewhat greater than the thickness of the boundary layer. The fins may have a uniform height over their entire length. Alternatively, the height may vary over the longitudinal direction. In particular, vortex generators whose height is less at a front end than at a rear end are usual. In this case, the fins may be substantially trapezoidal, or triangular. Variations therefrom are possible, both with curved front, rear, upper and/or lower edges, and with corners that are rounded to a greater or lesser extent.

A plane in which the respective fin is arranged may be flat or slightly curved. Both fins are arranged at an angle in relation to the longitudinal direction. This angle may lie, for example, in the range of from 5° to 45°, such that the two fins are aligned relative to each other at an angle in the range of from 10° to 90°. The two fins may be arranged, in particular, in mirror symmetry in relation to a longitudinal axis of the vortex generator that is aligned in the longitudinal direction.

The second length is less than the first length over the entire width of the base, that is, in other words, the base does not extend over the entire length of the fins in the direction of flow. The extent of the base in the longitudinal direction means the entire extent of the base in this direction, that is, from a point of the base located farthest to the front to a point of the base located farthest to the rear, in the direction of flow. For example, the base may be realized in the form of a strip, with front and rear edges arranged in parallel. In this case, the distance between the front edge and the rear edge of the base corresponds to the second length. Transversely in relation to the longitudinal direction, the base has a width that extends from the one fin to the other fin. Owing to the angular position of the fins, the base may be, in particular, trapezoidal, as viewed toward the surface. Alternatively, the base may also project laterally over the fins.

Typical dimensions of the entire vortex generator may be, for example, in a range of between a length of 2 cm and a width of 1.5 cm, and a length of 25 cm and a width of 20 cm, and the height of the fins may be, for example, in a range of between 20% and 100% of the length. The base, or the entire vortex generator, may be composed of a relatively stiff, inflexible material such as, for example, metal. A fiber composite material represents an alternative. The vortex generator may be produced as a single part or composed of a plurality of elements.

The disclosure makes use of the fact that, in the case of wind turbine rotor blades, the position-dependent change in the curvature of the surface is particularly pronounced in the longitudinal direction. As a result of the provided shortening of the length of the base in this longitudinal direction, the gap dimensions occurring between the fastening face and the surface of the rotor blade are reduced. The inventors have identified that, in the case of a sufficiently short base, the occurring gap dimensions can be reduced to such an extent that they can be compensated, for example, by the elasticity of a double-sided adhesive tape. For example, it is possible to use adhesive tapes having a thickness of 1.5 mm, which, owing to their elasticity, can effect a compensation of up to 25% of their thickness. If the base is shortened to such an extent that the size of the gaps occurring at the differing fastening positions does not change by more than, for instance, 0.375 mm, a reliable and particularly simple fastening with such an adhesive tape is accordingly possible. However, advantages are also obtained with the use of other adhesives.

In one configuration, the second length is not more than 70% of the first length. The second length may also be not more than 50%, not more than 40%, not more than 30%, or not more than 20% of the first length. This measure renders possible a further reduction of the occurring gap dimensions, such that a reliable fastening is also achieved in the case of large vortex generators. Tests have shown that the size of the remaining fastening face is sufficient, despite the shortening, in many cases.

In one configuration, the base has a fastening face for adhesive-bonding to a surface of a wind turbine rotor blade. The fastening face is located on an underside of the base. The fastening face may optionally extend over the entire underside of the base or over a portion thereof, in particular over a large portion of the total face of the underside of the base. In addition, the fastening face may have an activated surface, in order to ensure a particularly secure connection to the adhesive.

In one configuration, the fastening face has a curvature in the longitudinal direction. In principle, the fastening face may also be flat. However, a concave curvature, in particular, allows a further reduction of the occurring gap dimensions, in particular if it is matched to a mean curvature of the surface of the wind turbine rotor blade.

In one configuration, the fins each have a middle longitudinal portion, the lower edge of which is connected to the base, and a front longitudinal portion, which is arranged in front of the base in the longitudinal direction, and a rear longitudinal portion, which is arranged behind the base in the longitudinal direction. In this case, the front longitudinal portion and the rear longitudinal portion are not directly connected to the base. The base, however, is located in a middle position, and the fins are adequately fixed over their entire length. In the case of the disclosure, fastening of the front longitudinal portion or of the rear longitudinal portion to the surface of the rotor blade is not necessary, and is also not provided. Irrespective of this, sealing of the free space between the longitudinal portions and the surface of the rotor blade may be appropriate.

In one configuration, the front longitudinal portion is arranged in a plane, and has a lower edge that projects downward over the base, and/or the rear longitudinal portion is arranged in a plane, and has a lower edge that projects downward over the base. In this way, particularly in the case of very curved surfaces, the distance between the lower edges of the fins and the surface of the rotor blade can be reduced, which may be aerodynamically advantageous.

In one configuration, the lower edge of the front longitudinal portion and/or the lower edge of the rear longitudinal portion is curved. In particular, these edges may be matched to a mean curvature or to a minimal curvature of the surface of the wind turbine rotor blade. The curvature may add to a small distance between the fin and the surface.

In one configuration, a front longitudinal portion and/or a rear longitudinal portion of a fin has an angled peripheral portion at its lower edge. The peripheral portion may protrude from a plane in which the longitudinal portion is arranged. In particular, it may extend outwardly from the edge, that is, away from the other fin, or inwardly, to the other fin. The angled peripheral portion effects stiffening of the fin, and can counteract vibrations.

In one configuration, the vortex generator is produced by stamping out a flat material, and then bending the two fins at an angle relative to the base. This type of production is particularly simple. A particularly high degree of dimensional stability is achieved as a result of the bending at an angle. The flat material may be, in particular, a sheet metal, for example, of aluminum or steel, in particular high-grade steel. The flat material may have a uniform thickness, for example, in the range of from 0.3 mm to 3 mm. Optionally, the aforementioned edge portions may likewise be shaped, by simple bending at an angle, at the lower edges of front and/or rear longitudinal portions of the fins.

In one configuration, a double-sided adhesive tape is stuck onto the fastening face. The adhesive tape may have an elastic layer, in particular of foam and/or with a thickness of, for example, 1 mm or more. This enables differing gap dimensions to be compensated, as already explained. The vortex generator can be stuck onto the surface of a wind turbine rotor blade particularly easily, without further preliminary work.

In one configuration, the double-sided adhesive tape extends over the entire width of the fastening face, or of the base, and/or over the entire second length. This enables full-surface adhesion to be achieved.

In one configuration, a vortex generator is combined with a wind turbine rotor blade, the fastening face of the vortex generator being adhesive-bonded to a surface of the wind turbine rotor blade. The adhesive bonding may be produced, in particular, via a double-sided adhesive tape.

In one configuration, a sealing is arranged between the surface and edges of the vortex generator that adjoin the surface. The sealing may be effected, for example, via a sealing compound, for instance a silicone material. It may extend around the fastening face and/or be arranged between lower edges of the fins and the surface. On the one hand, the sealing protects the adhesive bond against external influences. On the other hand, accretion of dirt can be prevented. Furthermore, the sealing results in an optimal aerodynamic shape.

In one configuration, a plurality of identically shaped vortex generators are adhesive-bonded to the surface, at different positions of the surface at which the surface has differing curvatures. In the case of embodiments of the invention, individual matching of the geometry of the vortex generators to differing degrees of surface curvature is not necessary.

BRIEF DESCRIPTION OF THE DRAWINGS

The invention will now be described with reference to the drawings wherein.

All figures are schematic. In each figure, an arrow indicates the longitudinal direction 12 corresponding to the design incident-flow direction.

DESCRIPTION OF THE PREFERRED
EMBODIMENTS OF THE INVENTION

Figure 1:
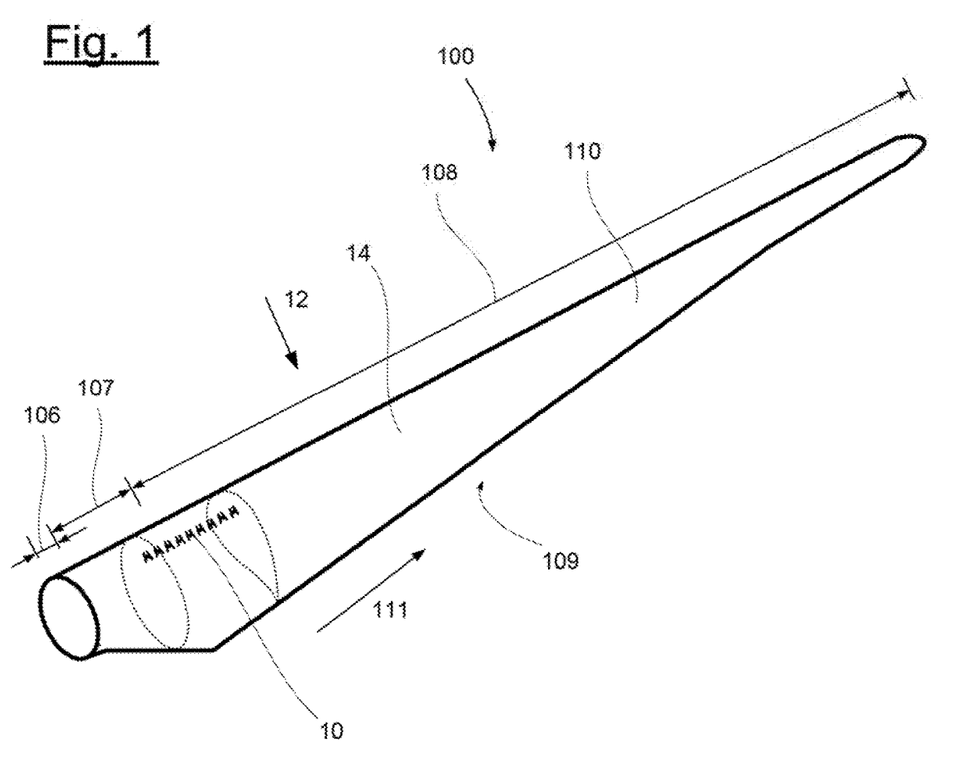
FIG. 1 shows a wind turbine rotor blade having vortex generators.

FIG. 1 shows a wind turbine rotor blade 100, which has a rotor blade-root region 106 that has a substantially circular cross section, a transition region 107 and a profile region 108. The wind turbine rotor blade 100 has, with respect to a direction of longitudinal extent 111, a pressure side 109 and an opposite suction side 110. The rotor blade 100 is substantially hollow on the inside. The rotor blade 100 has a series of vortex generators 10 on a surface 14 of the suction side 110.

Figure 2:
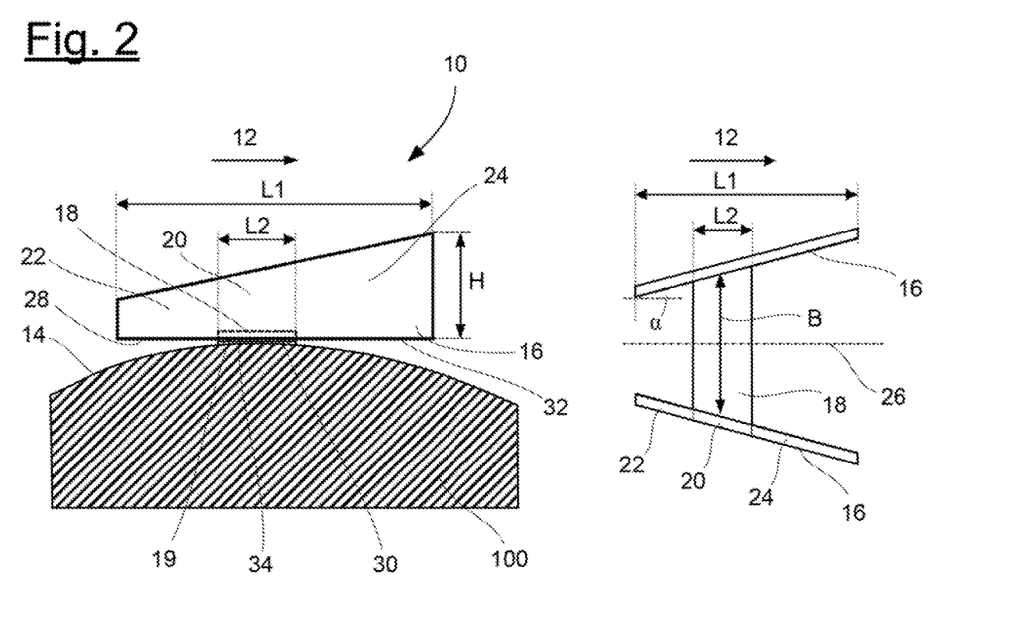
FIGS. 2 to 6 show in each case an embodiment of a vortex generator, in a view from the side in the left part of the figure, and in a view from above in the right part of the figure; and, FIGS. 7 and 8 show in each case a stamped part for producing a vortex generator, in a top view.

The vortex generator 10 from FIG. 2 is fastened to a surface 14 of a wind turbine rotor blade 100, a portion of which is represented in cross section along a profile plane. It has two fins 16 and a base 18. The fins 16 extend in the longitudinal direction 12, over a first length L1 in each case.

The base 18 has a width B, and extends in the longitudinal direction 12 over a second length L2, which is less than the first length L1.

The base 18 is realized in the form of a strip, the width B of the strip extending transversely in relation to the longitudinal direction 12. In the view from above represented in the right part of FIG. 2, it can be seen that the base 18 has an overall trapezoidal shape. At its lateral ends, the base 18 is connected to middle longitudinal portions 20 of the fins 16. In the example of FIG. 2, the base 18 is flat. On its underside it has a fastening face, likewise flat, that faces toward the surface 14. There is a double-sided adhesive tape 34 arranged between the fastening face and the surface 14.

The fins 16 have a height H that is greater at their rear end than at their front end. Arranged in front of the middle longitudinal portion 20 there is a front longitudinal portion 22, which is not directly connected to the base 18. Arranged behind the middle longitudinal portion 20 there is a rear longitudinal portion 24, which likewise is not directly connected to the base 18. The three longitudinal portions 20, 22, 24 of the fins 16 are each arranged in a plane that is aligned perpendicularly in relation to the base, or to the surface 14, of the wind turbine rotor blade, and at an angle $\alpha$ in relation to the longitudinal direction 12.

In the right part of FIG. 2 it can be seen that the vortex generator 10 is realized so as to be mirror-symmetrical in relation to a longitudinal axis 26. This applies, in particular, to the arrangement of the two fins 16.

The front longitudinal portion 22 has a lower edge 28. The middle longitudinal portion 20 has a lower edge 30 at which the fin 16 transitions into the base 18. The rear longitudinal portion 24 has a lower edge 32. In the embodiment of FIG. 2, the lower edges 28, 30, 32 are in a straight-line row.

Figure 3:
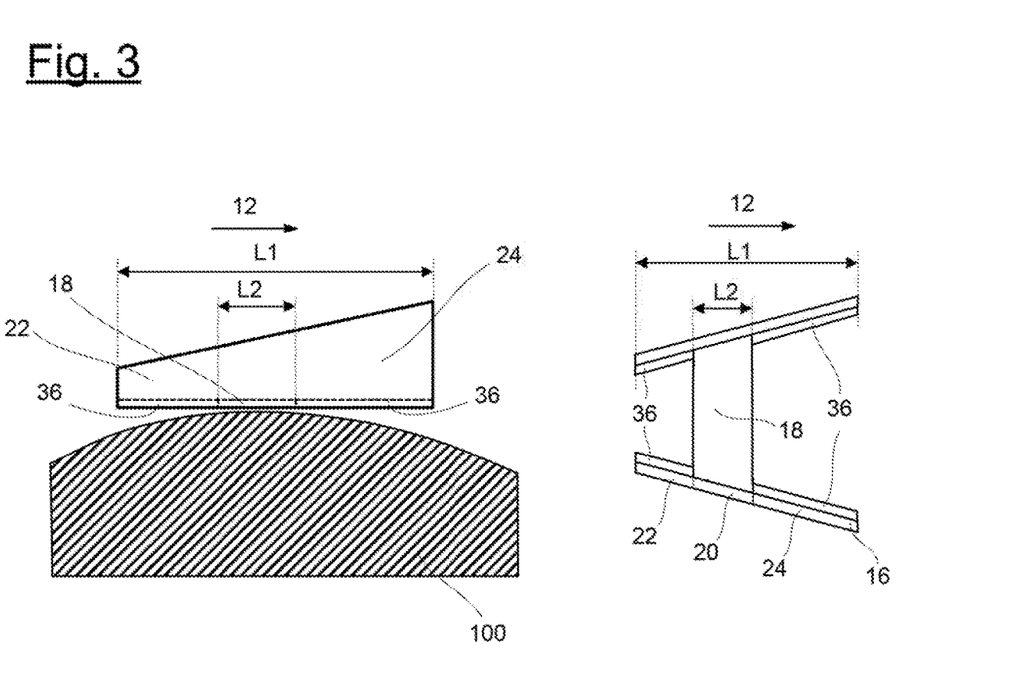

The vortex generator 10 from FIG. 3 corresponds largely to that from FIG. 2. The only difference is that the front longitudinal portions 22 and the rear longitudinal portions 24 of the fins 16 each have a peripheral portion 36 that, starting from the respective lower edge 28 and 32, respectively, of the respective longitudinal portion 22, 24, extends inward. These peripheral portions 36 are arranged in the same plane as the base 18.

Figure 4:
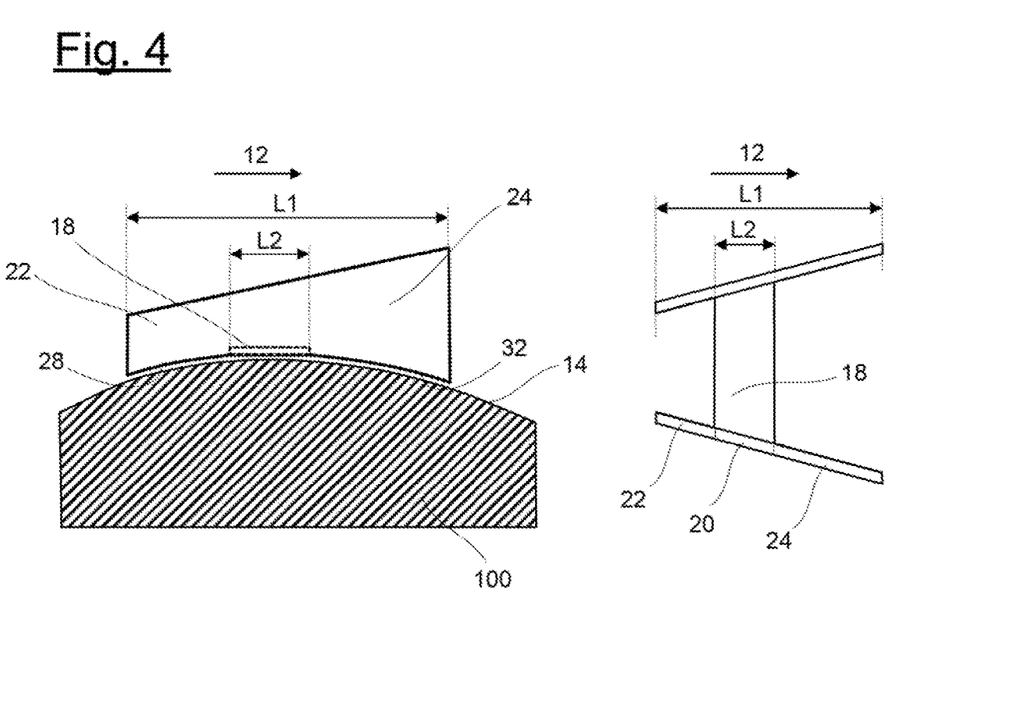

The vortex generator 10 from FIG. 4, likewise, largely corresponds to that from FIG. 2. The only difference is that the lower edges 28 and 32, respectively, of the front longitudinal portions 22 and of the rear longitudinal portions 24 of the fins are curved. They run at an approximately uniform distance from the surface 14. These lower edges 28, 32 project downwardly over the base 18.

Figure 5:
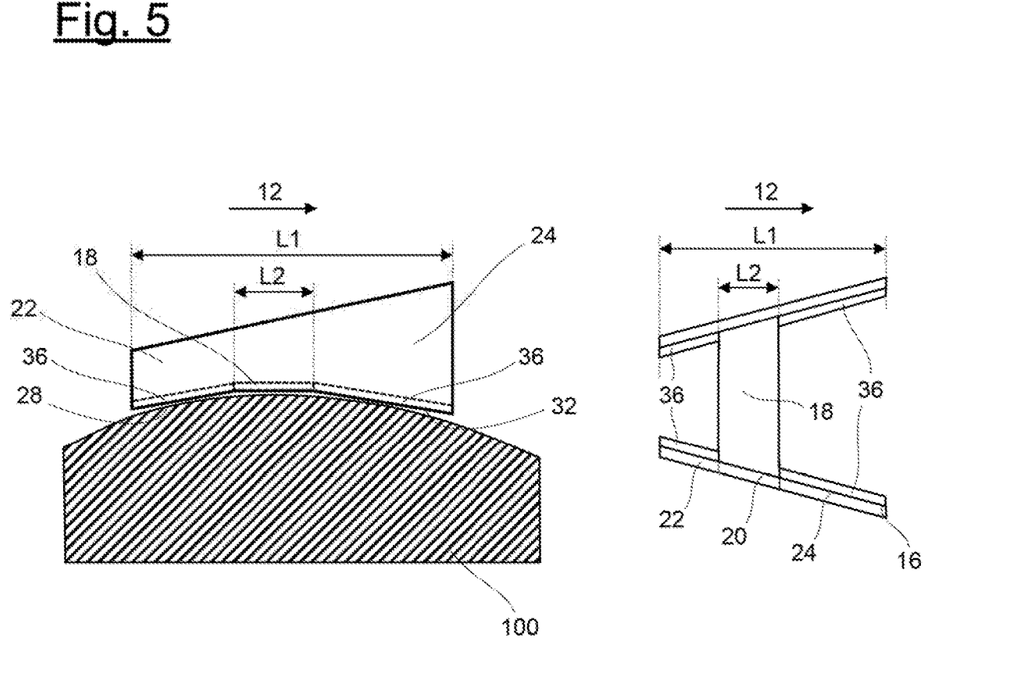

The vortex generator 10 from FIG. 5 corresponds largely to that from FIG. 3. The only difference is that, similarly to the vortex generator 10 from FIG. 4, the lower edges 28, 32 of, respectively, the front longitudinal portion 22 and of the rear longitudinal portion 24 of the fins 16 project downward over the base 18. Unlike the vortex generator 10 from FIG. 4, however, they run in a straight line.

Figure 6:
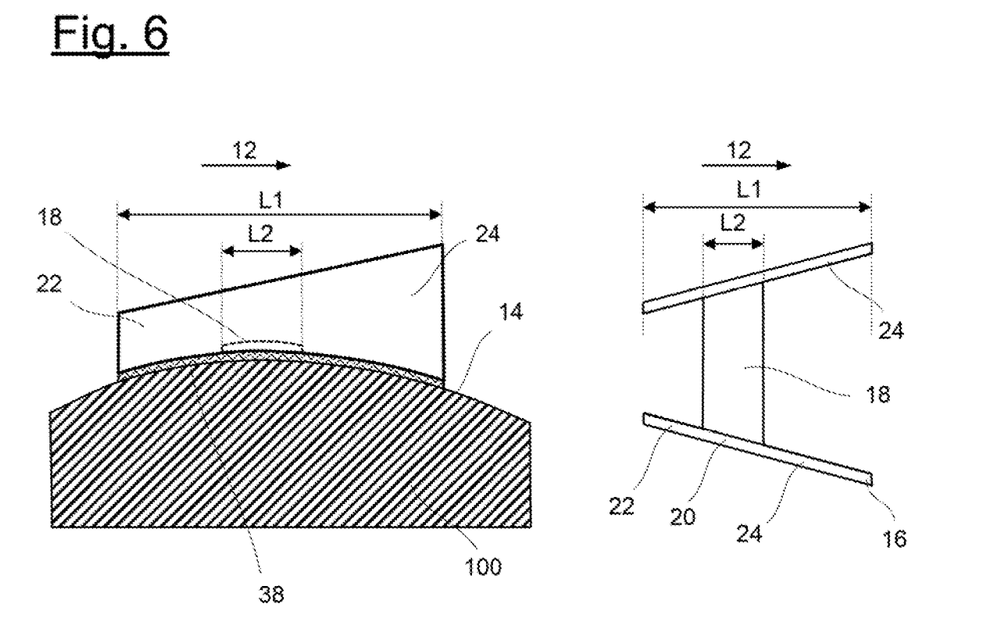

The vortex generator 10 from FIG. 6 corresponds largely to that from FIG. 4. The only difference is that, here, not only are the lower edges 28, 32 of, respectively, the front longitudinal portion 22 and of the rear longitudinal portion 24 of the fins 16 curved, but the base 18 also has a curvature. This curvature of the base 18 corresponds to a mean curvature of the surface 14 of the wind turbine rotor blade. Additionally indicated is a sealing 38, which fills a free space between the edges of the vortex generator 10 and the surface 14.

Figure 7:
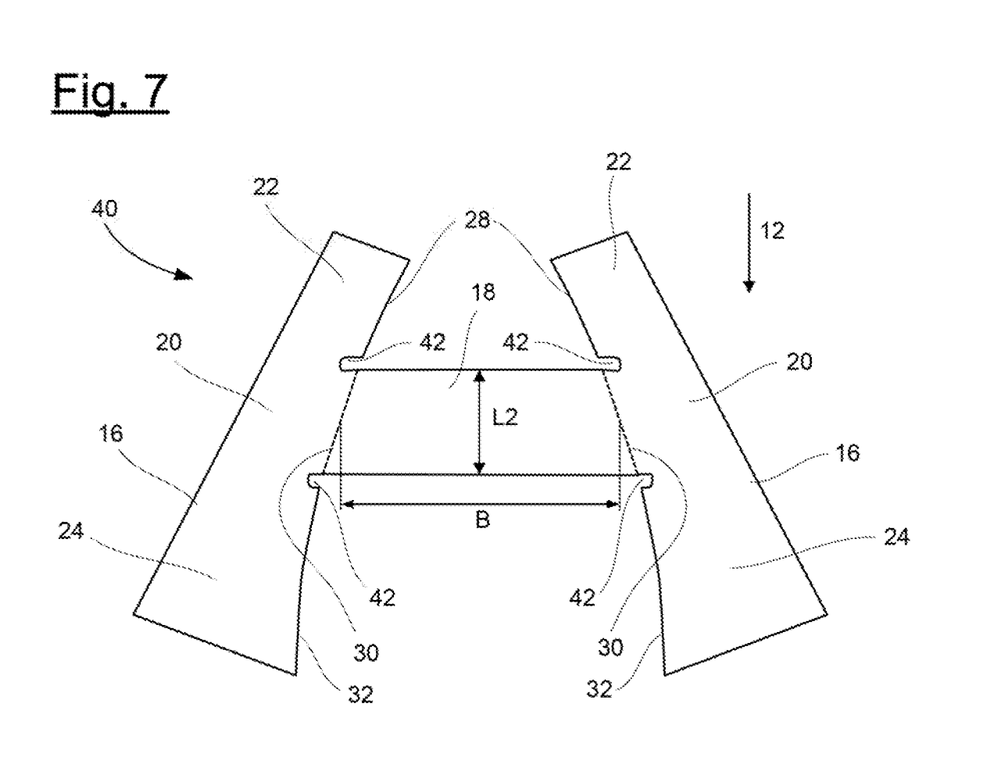

FIG. 7 shows a stamped part 40 of sheet steel, which has a base 18 and two fins 16. Middle longitudinal portions 20 of the fins 16 transition into the base 18 at the broken lines, the course of which corresponds to the lower edges 30 of the middle longitudinal portions 20. It is provided to bend the fins 16 at an angle relative to the base 18 along the broken lines. The lower edges 28 and 32, respectively, of the front longitudinal portions 22 and rear longitudinal portions 24 of the fins 16 are curved, such that, as a result of the fins 16 being set upright in this manner, a vortex generator 10 having a shape according to FIG. 4 is produced. Between the middle longitudinal portions and the respectively adjoining front and rear portions 22, 24, respectively, the stamped part 40 has recesses 42. These recesses 42 extend into the plane of the fins 16.

Figure 8:
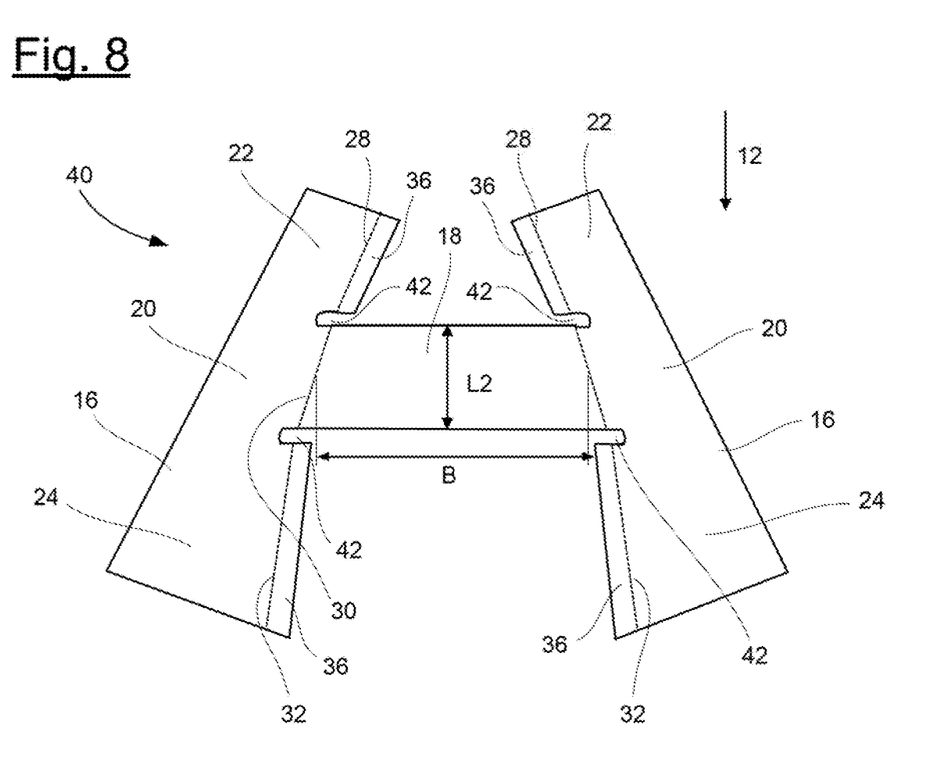

In the case of the stamped part 40 from FIG. 8, the lower edges 28, 32 of, respectively, the front longitudinal portions 22 and of the rear longitudinal portions 24 of the fins are realized as a straight line. Adjoining these lower edges 28, 32 are peripheral portions 36, which may be bent at an angle inwardly or outwardly relative to the plane of the longitudinal portions 22, 24. If they are bent at an angle inwardly, a vortex generator 10 whose shape corresponds to the vortex generator 10 from FIG. 5 is then produced.

It is understood that the foregoing description is that of the preferred embodiments of the invention and that various changes and modifications may be made thereto without departing from the spirit and scope of the invention as defined in the appended claims.

LIST OF REFERENCES

10 vortex generator
12 longitudinal direction
14 surface
16 fin
18 base
20 middle longitudinal portion
22 front longitudinal portion
24 rear longitudinal portion
26 longitudinal axis
28 lower edge of the front longitudinal portion 22
30 lower edge of the middle longitudinal portion 20
32 lower edge of the rear longitudinal portion 24
44 double-sided adhesive tape
36 peripheral portion
38 sealing
40 stamped part
42 recess
100 wind turbine rotor blade
106 rotor blade-root region
107 transition region
108 profile region
109 pressure side
110 suction side
111 direction of longitudinal extent
L1 first length
L2 second length
B width

What is claimed is:

1. A vortex generator defining a longitudinal direction in which the vortex generator receives an incident flow of air, the vortex generator comprising:
    two fins each arranged at an angle $\alpha$ in relation to the longitudinal direction;
    a base interconnecting the two fins;
    said base having a width (B) extending from one of the two fins to the other one of the two fins;
    said base having a forward edge facing into said incident flow and a rearward edge facing away from said incident flow;
    said forward and rearward edges delimiting said base along said width (B) between said fins;
    said base and each of said fins defining respective interfaces whereat said fins transition into said base;
    said two fins each having a first longitudinal portion having a first lower edge at a corresponding one of said interfaces;
    said two fins further each having a second longitudinal portion cantilevered from said first longitudinal portion and arranged to project outwardly from said base away from said forward edge thereof; and,
    each of said second longitudinal portions having a lower edge at an elevation at or lower than the elevation of the interface corresponding thereto.

2. The vortex generator of claim 1, wherein said base has a fastening face for bonding to a surface of a wind turbine rotor blade.

3. The vortex generator of claim 2, wherein said fastening face has a curvature in the longitudinal direction.

4. The vortex generator of claim 1, wherein:
    said two fins each further have a third longitudinal portion cantilevered from said first longitudinal portion and arranged to project outwardly from said base away from said rearward edge thereof; and,
    each of said third longitudinal portions have a lower edge at an elevation at or below the elevation of the interface corresponding thereto.

5. The vortex generator of claim 4, wherein:
    said second longitudinal portion is arranged in a plane and said lower edge thereof projects downward and extends outward beyond said base; and,
    said third longitudinal portion is arranged in a plane and said lower edge thereof projects downward and extends outward beyond the base.

6. The vortex generator of claim 4, wherein said second longitudinal portion is arranged in a plane and said lower edge thereof projects downward and extends outwardly beyond said base.

7. The vortex generator of claim 4, wherein said third longitudinal portion is arranged in a plane and said lower edge thereof projects downward and extends outwardly beyond the base.

8. The vortex generator of claim 4, wherein:
    at least one of said lower edge of said second longitudinal portion and said lower edge of said third longitudinal portion is curved.

9. The vortex generator of claim 4, wherein:
    at least one of said lower edge of said second longitudinal portion and said lower edge of said third longitudinal portion is arranged at an angle in relation to said lower edge of said first longitudinal portion.

10. The vortex generator of claim 4, wherein at least one of said second longitudinal portion and said third longitudinal portion has an angled peripheral portion at the lower edge thereof.

11. The vortex generator of claim 1, wherein the vortex generator is made by stamping out a flat material, and then bending said two fins at an angle relative to said base.

12. The vortex generator of claim 2 further comprising a double-sided adhesive tape stuck onto said fastening face.

13. The vortex generator of claim 12, wherein:
    said fastening face has a fastening face width; and, said double-sided adhesive tape extends, in the longitudinal direction, over an entirety of at least one of said fastening face width, said width B of said base, and said second length L2.

14. A wind turbine rotor blade comprising:
a rotor blade body defining a surface;
a vortex generator defining a longitudinal direction in which the vortex generator receives an incident flow of air during rotation of said rotor blade body;
said vortex generator having two fins each arranged at an angle α in relation to the longitudinal direction;
said vortex generator further having a base interconnecting the two fins;
said base having a width (B) extending from one of the two fins to the other one of the two fins;
said base having a forward edge facing into said incident flow and a rearward edge facing away from said incident flow;
said forward and rearward edges delimiting said base along said width (B) between said fins;
said base and each of said fins defining respective interfaces whereat said fins transition into said base;
said two fins each having a first longitudinal portion having a first lower edge at a corresponding one of said interfaces;
said two fins further each having a second longitudinal portion cantilevered from said first longitudinal portion and arranged to project outwardly from said base away from said forward edge thereof; and,
each of said second longitudinal portions having a lower edge at an elevation at or lower than the elevation of the interface corresponding thereto;
said vortex generator defining a fastening surface formed on said base; and,
said fastening surface being adhesively bonded to said surface of said rotor blade body.

15. The wind turbine rotor blade of claim 14 further comprising:
a seal;
said vortex generator defining edges adjoining said surface; and,
said seal being arranged between said surface and said edges of said vortex generator adjoining said surface.

16. The wind turbine rotor blade of claim 14, wherein a plurality of identically shaped ones of said vortex generator are adhesive-bonded to said surface, at different positions of said surface at which said surface has differing curvatures.

17. A method for making a vortex generator, the vortex generator defining a longitudinal direction and including two fins each arranged at an angle c in relation to the longitudinal direction and extending over a first length L1 in the longitudinal direction, the vortex generator further including a base interconnecting the two fins, the base having a width (B) extending from one of the two fins to the other one of the two fins, said base having a forward edge facing into said incident flow and a rearward edge facing away from said incident flow; said forward and rearward edges delimiting said base along said width (B) between said fins; said base and each of said fins defining respective interfaces whereat said fins transition into said base; said two fins each having a first longitudinal portion having a first lower edge at a corresponding one of said interfaces; said two fins further each having a second longitudinal portion cantilevered from said first longitudinal portion and arranged to project outwardly from said base away from said forward edge thereof; and, each of said second longitudinal portions having a lower edge at an elevation at or lower than the elevation of the interface corresponding thereto, the method comprising the steps of:
stamping out a flat material; and,
bending the two fins at an angle relative to the base after said stamping out the flat material.

18. A vortex generator defining a longitudinal direction in which the vortex generator receives an incident flow of air, the vortex generator comprising:
two fins each arranged at an angle α in relation to the longitudinal direction;
a base interconnecting the two fins;
said base having a width (B) extending from one of the two fins to the other one of the two fins;
said base having a forward edge facing into said incident flow and a rearward edge facing away from said incident flow;
said forward and rearward edges delimiting said base along said width (B) between said fins;
said base and each of said fins defining respective interfaces whereat said fins transition into said base;
said two fins each having a first longitudinal portion having a lower edge at a corresponding one of said interfaces;
said two fins further each having a second longitudinal portion cantilevered from said first longitudinal portion and arranged to project outwardly from said base away from said rearward edge thereof; and,
each of said second longitudinal portions having a lower edge at an elevation at or lower than the elevation of the interface corresponding thereto.

* * * * *

UNITED STATES PATENT AND TRADEMARK OFFICE
CERTIFICATE OF CORRECTION

PATENT NO. : 11,174,834 B2
APPLICATION NO. : 16/352637
DATED : November 16, 2021
INVENTOR(S) : M. Doosttalab et al.

Page 1 of 1

It is certified that error appears in the above-identified patent and that said Letters Patent is hereby corrected as shown below:

In the Specification

<u>In Column 7</u>:
Line 43: delete "44" and insert -- 34 -- therefor.

In the Claims

<u>In Column 10</u>:
Line 1: delete "c" and insert -- α -- therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*